United States Patent
Babbitt

(10) Patent No.: US 11,036,932 B2
(45) Date of Patent: Jun. 15, 2021

(54) TECHNOLOGY PLATFORM HAVING INTEGRATED CONTENT CREATION FEATURES

(71) Applicant: LOGIC RENAISSANCE LLC, New Orleans, LA (US)

(72) Inventor: Charles Babbitt, New Orleans, LA (US)

(73) Assignee: BLOCKPAD LLC, New Orleans, LA (US)

( * ) Notice: Subject to any disclaimer, the term of this patent is extended or adjusted under 35 U.S.C. 154(b) by 0 days.

(21) Appl. No.: 16/774,963

(22) Filed: Jan. 28, 2020

(65) Prior Publication Data
US 2020/0242301 A1    Jul. 30, 2020

Related U.S. Application Data

(60) Provisional application No. 62/798,728, filed on Jan. 30, 2019.

(51) Int. Cl.
*G06F 40/18* (2020.01)
*G06F 3/0481* (2013.01)
*G06F 3/0484* (2013.01)

(52) U.S. Cl.
CPC .......... *G06F 40/18* (2020.01); *G06F 3/04817* (2013.01); *G06F 3/04842* (2013.01)

(58) Field of Classification Search
CPC ... G06F 3/04817; G06F 40/18; G06F 3/04842
USPC ........................................................ 715/212
See application file for complete search history.

(56) References Cited

U.S. PATENT DOCUMENTS

| | | | |
|---|---|---|---|
| 5,680,557 A | 10/1997 | Karamchetty | |
| 7,350,141 B2 | 3/2008 | Kotler et al. | |
| 7,412,645 B2 | 8/2008 | Kotler et al. | |
| 7,860,691 B2 | 12/2010 | Beltran et al. | |
| 8,082,489 B2 | 12/2011 | Jiang et al. | |
| 2002/0065849 A1 | 5/2002 | Ferguson et al. | |
| 2005/0125377 A1 | 6/2005 | Kotler et al. | |
| 2013/0290825 A1* | 10/2013 | Arndt | G06F 40/18 715/227 |
| 2014/0040826 A1* | 2/2014 | Wei | G06F 3/0488 715/810 |
| 2016/0085430 A1* | 3/2016 | Moran | G06F 9/451 715/765 |

(Continued)

OTHER PUBLICATIONS support.microsoft.com, "Overview of Formulas in Excel" Retrived from the Internet on Jun. 3, 2020. https://support.microsoft.com/en-us/office/overview-of-formulas-in-excel-ecfdc708-9162-49e8-b993-c311f47ca173?ui=en-us&rs=en-us&ad=us.

(Continued)

*Primary Examiner* — William D Titcomb
(74) *Attorney, Agent, or Firm* — Marshall, Gerstein & Borun LLP

(57) ABSTRACT

Systems and methods for facilitating various content creation functionalities are described. According to certain aspects, an electronic device may arrange a first frame within an electronic file and define a first dynamic object within the first frame, where the first dynamic object comprises a first formula having a variable with a value. The electronic device may detect an additional instance of the variable within the electronic file and automatically associate the value of the variable with the additional instance of the variable.

16 Claims, 12 Drawing Sheets

(56) References Cited

U.S. PATENT DOCUMENTS

| | | | | |
|---|---|---|---|---|
| 2017/0124740 A1* | 5/2017 | Campbell | .......... | G06K 9/00442 |
| 2017/0126772 A1* | 5/2017 | Campbell | ............... | G06F 40/18 |
| 2017/0315979 A1* | 11/2017 | Boucher | ............... | G06F 40/106 |
| 2018/0157468 A1* | 6/2018 | Stachura | .................... | G06F 8/38 |
| 2019/0129929 A1* | 5/2019 | Neylan | ................. | G06F 3/0483 |
| 2019/0340219 A1* | 11/2019 | Schoedl | ................. | G06F 40/18 |

OTHER PUBLICATIONS support.microsoft.com, "Create a Chart From Start to Finish" Retrieved from the Internet on Jun. 3, 2020: https://support.microsoft.com/en-us/office/create-a-chart-from-start-to-finish-0baf399e-dd61-4e18-8a73-b3fd5d5680c2?ui=en-us&rs=en-us&ad=us.

techrepublic.com, "10 Things You Need to Know About Using Word Fields" Retrieved from the Internet on Jun. 3, 2020: https://www.techrepublic.com/blog/10-things/10-things-you-need-to-know-about-using-word-fields/.

teklastructures.support.tekla.com, Tekla Structures, "Functions in Variable Formulas" Retrieved from the Internet on Jun. 3, 2020: https://teklastructures.support.tekla.com/2019/en/det_functions_in_variable_formulas.

\* cited by examiner

FIG. 3B

TECHNOLOGY PLATFORM HAVING INTEGRATED CONTENT CREATION FEATURES

CROSS-REFERENCE TO RELATED APPLICATIONS

The present application claims priority to U.S. Provisional Patent Application No. 62/798,728, filed Jan. 30, 2019, which is hereby incorporated by reference in its entirety.

FIELD

The present disclosure is directed to content creation technologies. More particularly, the present disclose is directed to technologies for creating and utilizing digital content and digital objects for various data processing tasks within computer-executed applications.

BACKGROUND

Individuals have an array of available applications to use to create and modify digital content. For example, a marketing employee may wish to add a flowchart to a digital presentation. As an additional example, an engineer may want to generate a calculation report with sketches, equations, tables, and text. Generally, these individuals need to be able to efficiently manage repetitive tasks and changes without manually repeating parts of projects.

However, existing applications are limited in their ability to enable reproducibility of content within and across electronic files supported by the applications. For example, a user may specify a value for a variable within a cell of a spreadsheet, but is then unable to efficiently reference that value for use in another cell of the spreadsheet.

Accordingly, there is an opportunity for systems and methods to enable creation of content that may be effectively utilized within and across electronic files supported by applications.

SUMMARY

According to embodiments, a system for managing electronic files may be provided. The system may comprise a user interface, a memory storing a set of computer-executable instructions, and a processor interfacing with the user interface and the memory. The processor may be configured to execute the set of computer-executable instructions to cause the processor to: cause the user interface to display an electronic file for editing by a user, enable the user to arrange, within the electronic file via the user interface, a first frame, enable the user to define, via the user interface, a first dynamic object within the first frame, wherein the first dynamic object comprises a first formula having a variable with a value, detect an additional instance of the variable within the electronic file, automatically associate the value of the variable with the additional instance of the variable, and cause the user interface to reflect that the value is associated with the additional instance of the variable.

According to another embodiment, a computer-implemented method in an electronic device of managing electronic files may be provided. The method may include: displaying, in a user interface of the electronic device, an electronic file for editing by a user; enabling the user to arrange, within the electronic file via the user interface, a first frame; enabling the user to define, via the user interface, a first dynamic object within the first frame, wherein the first dynamic object comprises a first formula having a variable with a value; detecting, by a processor, an additional instance of the variable within the electronic file; automatically associating, by the processor, the value of the variable with the additional instance of the variable; and displaying, in the user interface, an indication that the value is associated with the additional instance of the variable.

BRIEF DESCRIPTION OF THE FIGURES

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIGS. 3A and 3B depict example representations of certain features associated with blocks, in accordance with some embodiments.

DETAILED DESCRIPTION

According to embodiments, technologies for supporting content creation using electronic devices are disclosed. In aspects, systems and methods may support a content creation platform that improves productivity using an integrated file format and with tools to address repetitive tasks. Generally, the systems and methods may facilitate the described functionalities within one or more electronic files, which may be accessed or modified by a user via one or more types of electronic devices.

Certain terms are used repetitively throughout this disclosure. Generally, it should be understood that an electronic file or document may consist of electronic data accessible by a computing device. An electronic file may include a set of frames, and where each frame may be separate within the electronic file or nested within another frame. For example, a frame may be an electronic document, a table, a spreadsheet, a drawing, a two-dimensional model, a three-dimensional model, or the like.

Each frame may include a set of dynamic objects, which may be defined by a user. For example, a dynamic object may be a cell for a spreadsheet or table, an equation, a dynamic plot, a block, or the like. Each dynamic object may include a formula(s) that specifies at least one variable and a value for the variable(s). Each frame may also define a namespace that may provide access to an object(s) and a variable(s) (of a formula(s)) under that frame.

A variable that is specified by a formula may be replicated/used within and across dynamic objects. Accordingly, when a variable is added to an object, the specified value for that variable may be used for each instance of that variable within the electronic file. Similarly, when the value of a variable is changed, the change may propagate to the object(s) that uses that variable.

The systems and methods discussed herein address a challenge that is particular to electronic file creation. In particular, the challenge relates to a difficulty in linking features or objects across one or more electronic documents or portions of electronic documents. This is particularly apparent in situations in which efficiency in electronic document creation lags because of the inability to reference certain features or objects. In conventional technologies, features and objects are not able to be readily referenced or reproduced when a user creates new portions of electronic documents. In contrast, the systems and methods enable for the automatic associating and replicating of features or objects so that they may efficiently and effectively used throughout and across electronic documents. Therefore, because the systems and methods employ the creation, storage, and updating of data associated with electronic documents, the systems and methods are necessarily rooted in computer technology in order to overcome the noted shortcomings that specifically arise in the realm of electronic file creation.

Figure 1:
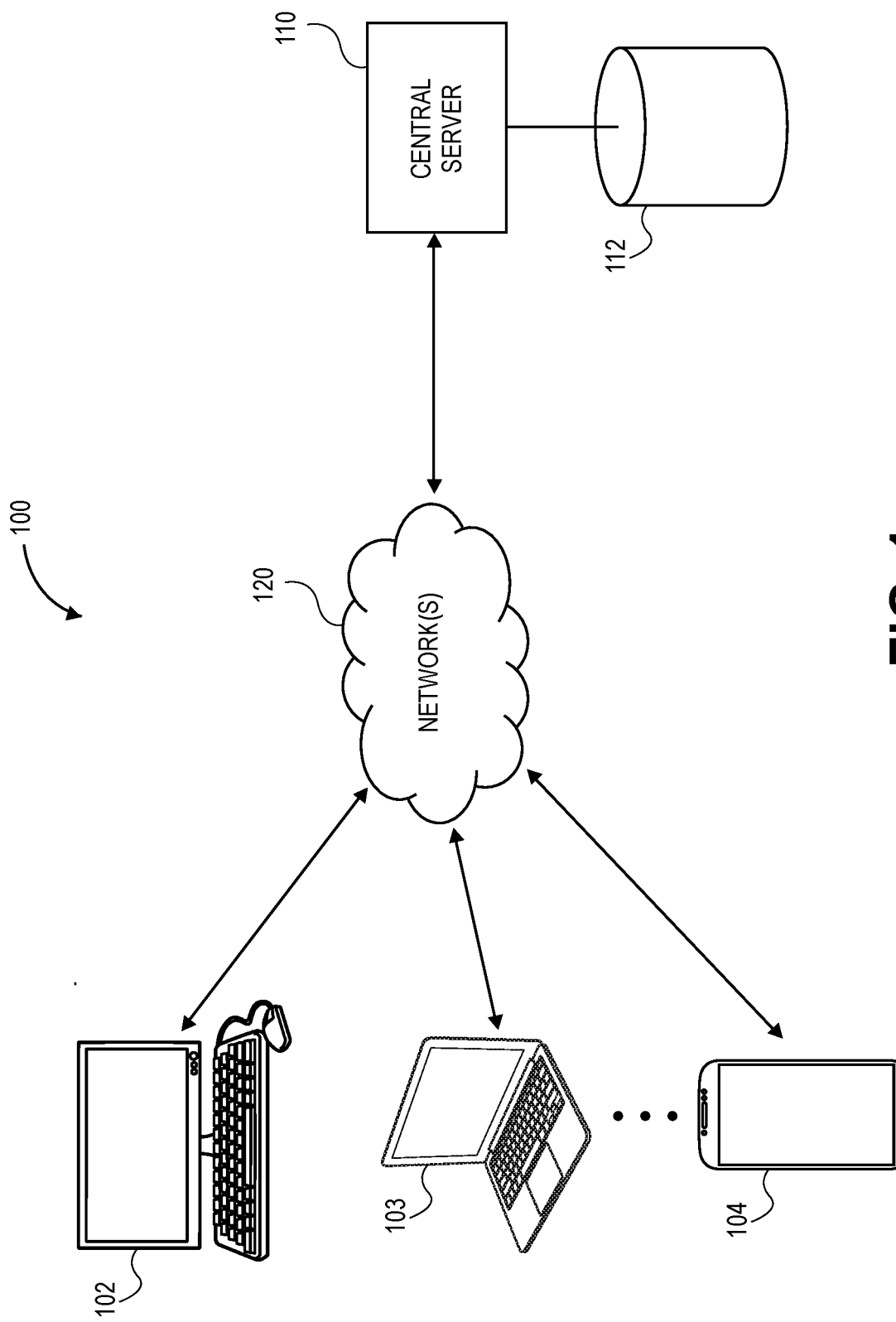
FIG. 1 depicts an overview of components and entities associated with the systems and methods, in accordance with some embodiments.

FIG. 1 illustrates an overview of a system 100 of components configured to facilitate the systems and methods. It should be appreciated that the system 100 is merely an example and that alternative or additional components are envisioned.

As illustrated in FIG. 1, the system 100 may include a set of electronic devices 102, 103, 104 configured for use by a set of users (not shown in FIG. 1). Each of the electronic devices 102, 103, 104 may be any type of electronic device such as a mobile device (e.g., a smartphone), desktop computer, notebook computer, tablet, phablet, GPS (Global Positioning System) or GPS-enabled device, smart watch, smart glasses, smart bracelet, wearable electronic, PDA (personal digital assistant), pager, computing device configured for wireless communication, and/or the like. Each of the electronic devices 102, 103, 104 may support execution of an application that is configured to functionalities as described herein. Similarly, a user may use any of the electronic devices 102, 103, 104 to create, access, and/or modify content via the application. Each of the electronic devices 102, 103, 104 may include or support integration with one or more user input components or peripherals (e.g., a touchscreen, a mouse, a keyboard, etc.).

The electronic devices 102, 103, 104 may communicate with a central server 110 via one or more networks 120. The central server 110 may be associated with an entity associated with the application that may execute on the electronic devices 102, 103, 104. For example, the entity may be a company that develops and supports the application, such as in a software as a service (SaaS) arrangement. Generally, the central server 110 may support the application that is executable by the set of electronic devices 102, 103, 104 (i.e., the set of electronic devices 102, 103, 104 may interface with the central server 110 in executing the application). In embodiments, the central server 110 may include or support a web server configured to host a website that supports the application for access and use by the electronic devices 102, 103, 104. In embodiments, the network(s) 120 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others).

Although depicted as a single central server 110 in FIG. 1, it should be appreciated that the server 110 may be in the form of a distributed cluster of computers, servers, machines, or the like. In this implementation, the entity may utilize the distributed server(s) 110 as part of an on-demand cloud computing platform. Accordingly, when the electronic devices 102, 103, 104 interface with the server 110, the electronic devices 102, 103, 104 may actually interface with one or more of a number of distributed computers, servers, machines, or the like, to facilitate the described functionalities.

The central server 110 may be configured to interface with or support a memory or storage 112 capable of storing various data, such as in one or more databases or other forms of storage. According to embodiments, the storage 112 may store data or information associated with user accounts, electronic documents created by users, a set of templates for electronic documents, and/or other data.

Although three (3) electronic devices 102, 103, 104, and one (1) server 110 are depicted in FIG. 1, it should be appreciated that greater or fewer amounts are envisioned. For example, there may be multiple central servers, each one associated with a different entity. Additionally, the electronic devices 102, 103, 104 and the central server 110 may interface with one or more separate, third-party servers (not depicted in FIG. 1) to retrieve relevant data and information.

Figure 2:
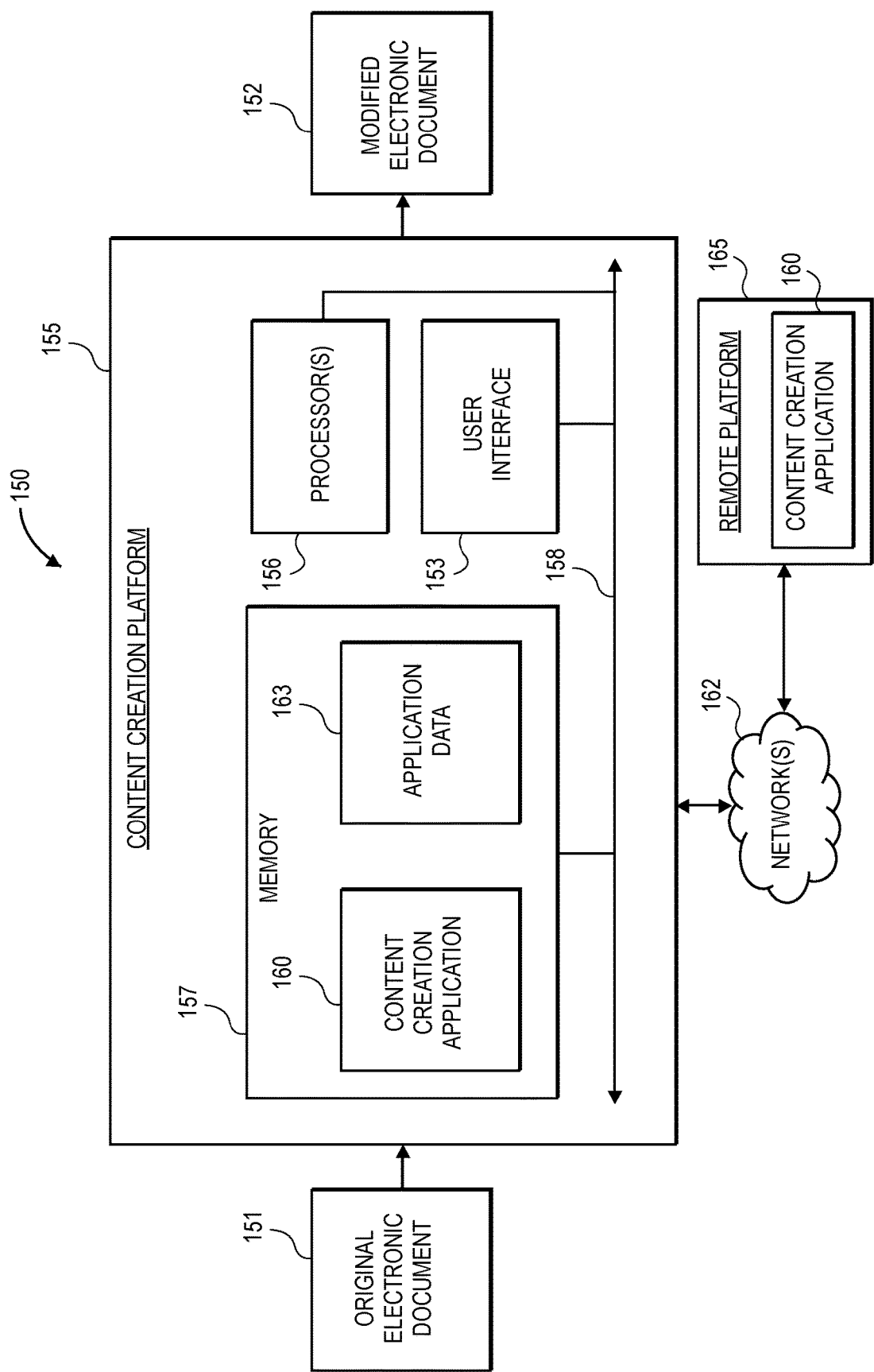
FIG. 2 depicts an overview of certain components configured to facilitate the systems and methods, in accordance with some embodiments.

According to embodiments, users of the electronic devices 102, 103, 104 may select to access, create, or modify an electronic document using the electronic devices 102, 103, 104 and components thereof. Accordingly, the respective electronic devices 102, 103, 104 may display the accessed, created, or modified designs for review by the users. FIG. 2 depicts more specific components associated with the systems and methods.

FIG. 2 an example environment 150 in which an original electronic document 151 is processed/modified into a modified electronic device 152 via a content creation platform 155, according to embodiments. The content creation platform 155 may be implemented on any computing device, including one or more of the electronic devices 102, 103, 104 or the server 110 as discussed with respect to FIG. 1. Components of the computing device may include, but are not limited to, a processing unit (e.g., processor(s) 156), a system memory (e.g., memory 157), and a system bus 158 that couples various system components including the memory 157 to the processor(s) 156. In some embodiments, the processor(s) 156 may include one or more parallel processing units capable of processing data in parallel with one another. The system bus 158 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The content creation platform 155 may further include a user interface 153 configured to present content (e.g., electronic documents and content thereof). Additionally, a user may make selections to the electronic documents and content thereof via the user interface 153, such as to input equations. The user interface 153 may be embodied as part of a touchscreen configured to sense touch interactions and gestures by the user. Although not shown, other system components communicatively coupled to the system bus 158 may include input devices such as cursor control device (e.g., a mouse, trackball, touch pad, etc.) and keyboard (not shown). A monitor or other type of display device may also be connected to the system bus 158 via an interface, such as a video interface. In addition to the monitor, computers may also include other peripheral output devices such as a printer, which may be connected through an output peripheral interface (not shown).

The memory 157 may include a variety of computer-readable media. Computer-readable media may be any available media that can be accessed by the computing device and may include both volatile and nonvolatile media, and both removable and non-removable media. By way of non-limiting example, computer-readable media may comprise computer storage media, which may include volatile and nonvolatile, removable and non-removable media implemented in any method or technology for storage of information such as computer-readable instructions, routines, applications (e.g., a content creation application 160) data structures, program modules or other data. Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the processor 156 of the computing device.

The content creation platform 155 may operate in a networked environment and communicate with one or more remote platforms, such as a remote platform 165, via a network 162, such as a local area network (LAN), a wide area network (WAN), or other suitable network. The platform 165 may be implemented on any computing device, including one or more of the electronic devices 102, 103, 104 or the server 110 as discussed with respect to FIG. 1, and may include many or all of the elements described above with respect to the platform 155. In some embodiments, as will be described herein, the content creation application 160 as will be further described herein may be stored and executed by the remote platform 165 instead of by or in addition to the platform 155.

According to embodiments, the content creation platform 155 (and more particularly, the content creation application 160) may process or modify the original electronic document 151 to produce the modified electronic document 152. It should also be understood that although only one of each of the original electronic document 151 and the modified electronic document 152 is shown, the example environment 150 may be configured to process or modify multiple electronic documents. Each of the original electronic document 151 and the modified electronic document 152 may be embodied as any type of electronic document, file, template, etc., that may include a set of design elements or components, each of which may be some type of displayable content (e.g., a combination of textual and/or visual content).

The memory 157 may further store application data 163 accessible to the content creation application 160. According to embodiments, the application data 163 may include data associated with the makeup of the original electronic document 151. For example, the application data 163 may include blocks, node structures, formulas, and/or other components. The application data 163 may further include additional electronic documents accessible to a user.

In embodiments, the content creation application 160 may process the original electronic document 151 by modifying, inserting, replacing, and/or deleting certain components. The content creation application 160 may cause the contents of the original electronic document 151 to be displayed on the user interface 153 for review by the user. The user may select to complete the creation of the original electronic document 151, at which point the content creation application 160 may output or otherwise avail the modified electronic document 152. In embodiments, the designs 151, 152 may be stored in memory as program data in a hard disk drive, magnetic disk and/or optical disk drive in the content creation platform 155 and/or the remote platform 165. The design creation and processing techniques discussed herein are illustrated in certain of the following figures.

A "block," as used herein, is a group of objects in an electronic file that is automatically generated. Some examples of a block include: drawing shapes, calculation modules, pivot tables, tables of contents, maps, and charts. A block may also be any portion of an electronic file that may be re-used. Generally, a block may behave as one portion with one or more specific inputs. Further, each block may have a block definition, which may use the input(s) to generate the block.

According to some embodiments, a block may be an application or applet that may be executed inside of electronic files. In an implementation, a block can link into the electronic file like a spreadsheet formula, but unlike a spreadsheet formula, a block can define whole groups of objects. Additionally, unlike traditional applications (e.g., special engineering programs, smartphone applications, etc.), a user does not have to take any action to re-run blocks. Instead, blocks update automatically when corresponding formulas (or other associated objects) update.

A block may also work as a function, as it is understood in a computer programming context. Unlike functions is certain computing programming environments, a block is designed for ordinary users to use. Because blocks generate objects to place into an electronic file, they are similar to React.js components. Unlike comparable components from, for example, AutoCAD, blocks as described here may generate any type of content (e.g., text, two-dimensional geometry, three-dimensional geometry, spreadsheet cells, etc.).

Figure 3A:
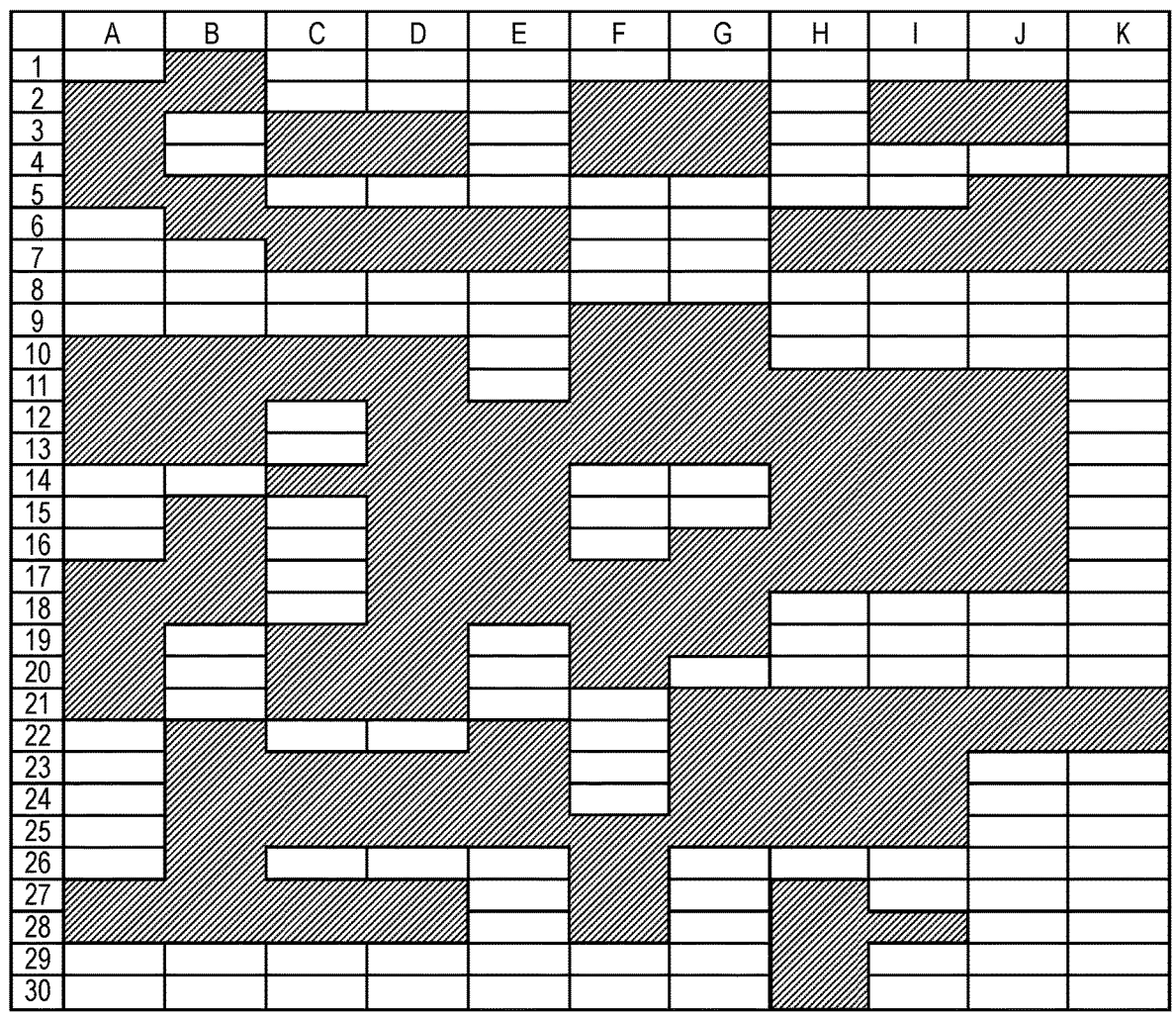
Figure 3B:
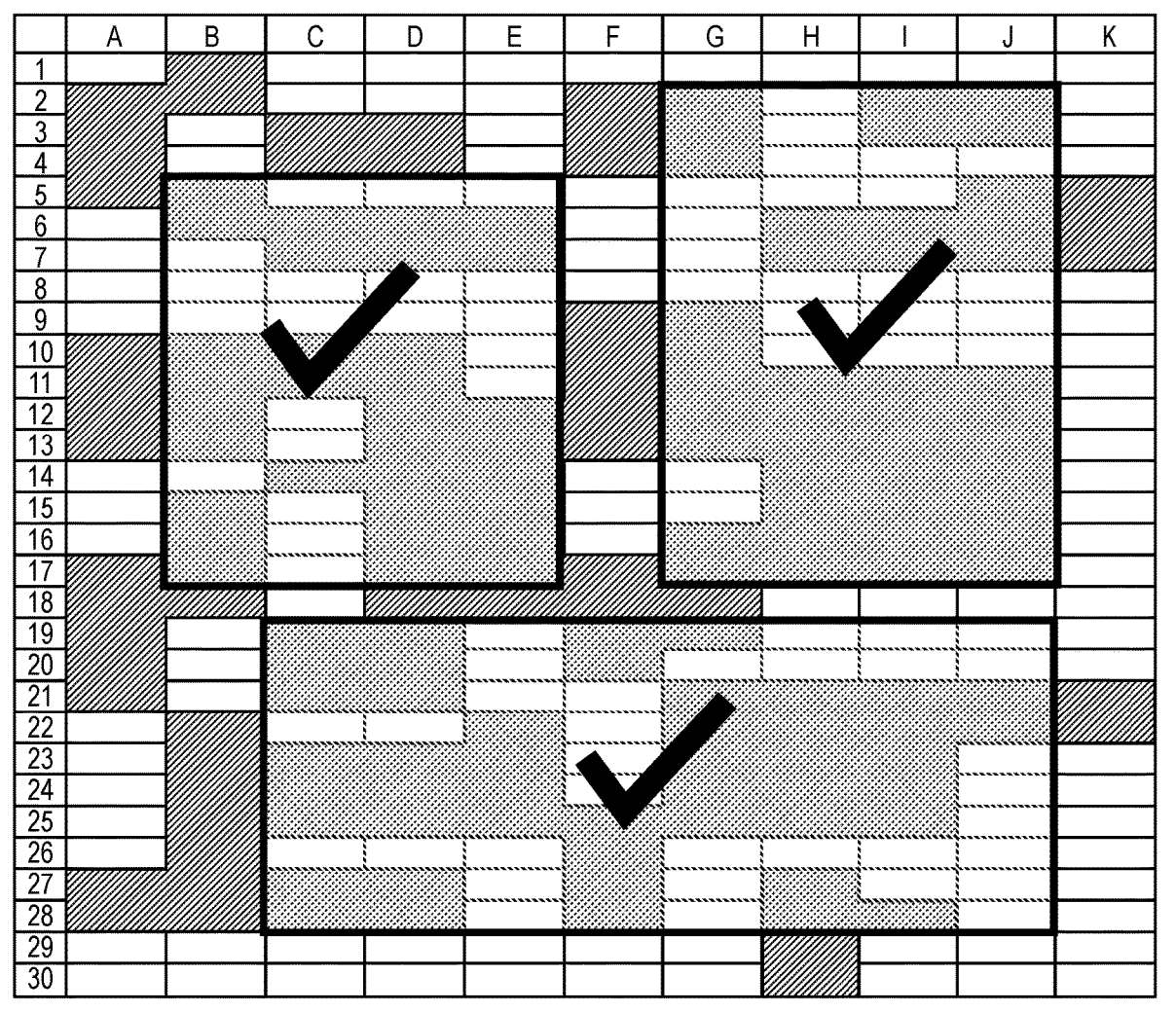

Additionally, compared to traditional copying and pasting, blocks may enable the user with more control. Because each block may be modified through specific inputs, mistakes may be reduced when a user inserts a new block. For example, in a large spreadsheet without blocks, there can be many formulas, each one with a chance of having an error, as illustrated in FIG. 3A. In a large spreadsheet organized into blocks, however, the blocks are more tightly controlled, so they can be checked once and re-used with confidence, as illustrated in FIG. 3B. As a result, there are fewer potential errors in an electronic file, thus making the electronic file easier to check and verify.

In electronic files organized by blocks, it is also easier to make changes. For example, if a user changes any original content, the corresponding blocks update automatically without the user having to copy and paste content. Blocks also help with large volumes of work. For example, to facilitate a mail merge with a document, a user may define the document as a block and then create a table of blocks to manage all the copies. In cases where it is desirable to edit a block without restrictions, it is still possible to "explode"

the block (i.e., to edit any of its objects, as if it were copied and pasted). When a block is exploded, the objects may no longer behave like a block.

There are several ways to define blocks, including scenarios (e.g., for ordinary users), scripts (e.g., for programmers), and web services (e.g., for programmers). With a scenario, a user may define blocks intuitively based on a file, where the user may choose a portion of the file to use as a block, then choose specific objects as inputs. For example, if the user chooses three spreadsheet cells as inputs, then those three cells can be changed as inputs each time the block is used, where each block may show a scenario of the original file. In an implementation, blocks created from the original file may not have an effect on original file itself. Computer programmers can also create blocks in other ways, such as with scripts and web services.

Blocks may be created and used directly from one file to another, or they may be stored in a library (i.e., implemented in a memory). Using blocks directly makes it easier to make changes that roll out to each block automatically, and storing blocks in the library makes it easier to ensure the blocks remain consistent.

To insert a block into file, a user may choose a block from the library, or the user may define a new block directly from a file. In particular, the user may select values for inputs for the block, where the values may be simple values, such as numbers, or they may be formulas to link to variables in a destination file. Once a block is inserted, a user may modify the inputs. If the user used formulas for inputs, a block may update automatically with no user action.

A "block table," as used herein, is a group of blocks that an application may use to efficiently manage the group of blocks. To create a block table, a user may use the application to create a block table (e.g., via a toolbar or menu), select a block from the library or define a new block directly from a file, select where to create the block table (e.g., inline in a frame, in a new table or spreadsheet, or in a new file), and edit input values in the block table and/or add or remove blocks in the block table. Generally, block tables may enable users to automate tasks that would previously require writing macros or other types of computer programming.

Generally, blocks may allow for a more organized way to create and manage content. By organizing spreadsheets, documents, and drawings into blocks, electronic devices may enable users to build large files that are easier to maintain, thus avoiding mistakes and improving efficiency. Organization is especially important for engineering work, where calculation verification is important. The efficiency created by linking blocks together also enables engineers to more easily optimize designs.

A system of blocks, such as those saved within a library, creates the opportunity for an "app store" for blocks. Currently, platforms merely support manual content creation. In contrast, the present embodiments enable the automation of content creation and management.

Figure 4A:
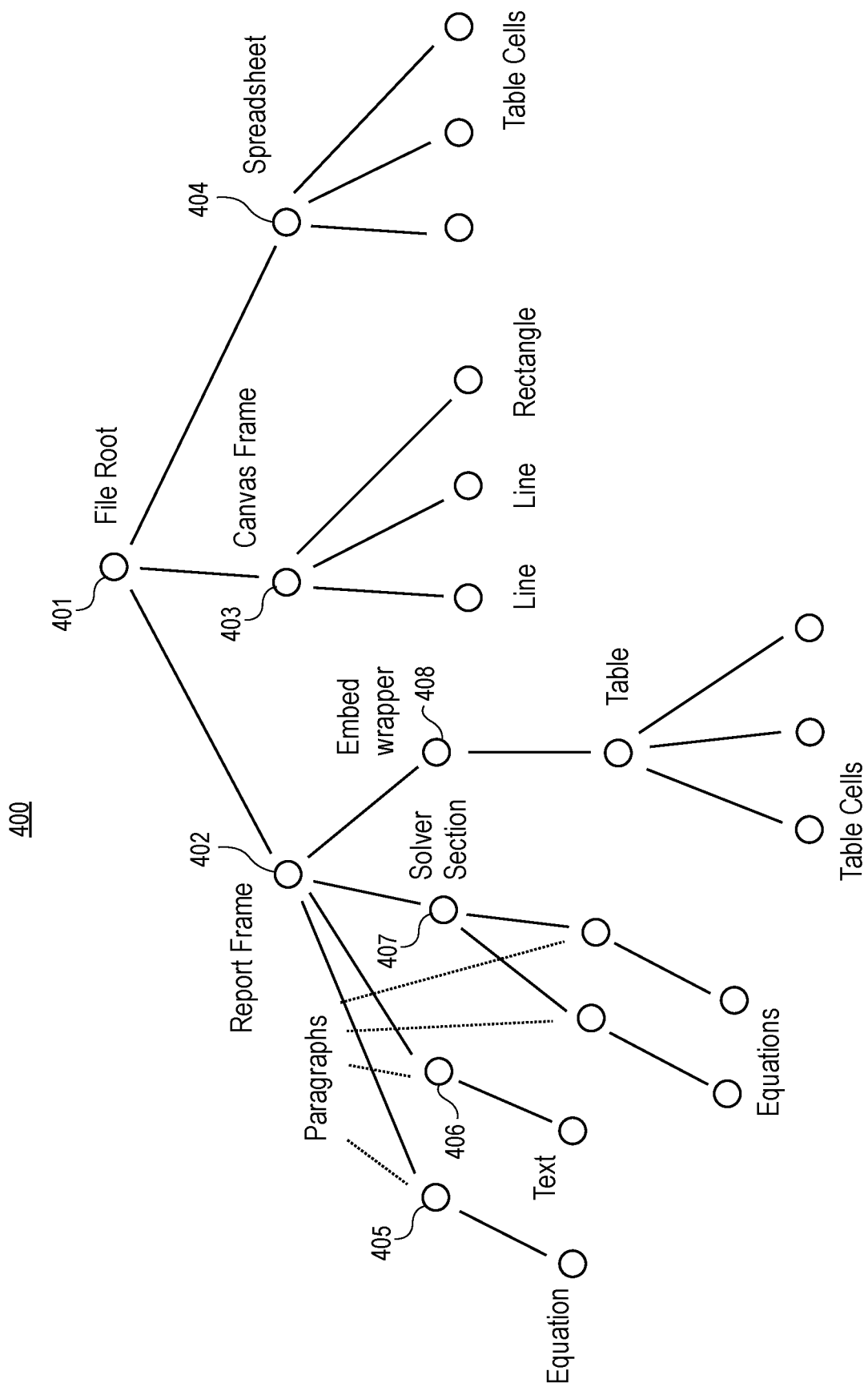
FIGS. 4A-4E depict example representations of certain features associated with dynamic nodes, in accordance with some embodiments.

FIG. 4A depicts a representation 400 of an implementation of an electronic file that may be used in association with the described embodiments. The representation 400 is organized into a node tree structure, where each node may have a type, a list of properties, and/or a list of children. It should be appreciated that the representation 400 of the implementation is merely an example and may include alternative or additional content. According to embodiments, various components of the content creation platform 155 as discussed with respect to FIG. 2 may access, modify, and store the electronic file and components thereof.

The representation 400 includes a root node 401 that may represent an electronic file, where the root node 401 may have a set of child nodes that are frames (e.g., spreadsheets, tables, reports, 2D drawings, 3D models, plain text, scripts, images, presentation slides, graphs, and/or the like). As depicted in FIG. 4A, the root node 401 has three child nodes: a report frame 402, a canvas frame 403, and a spreadsheet 404.

Each child node of the frames may have a set of child nodes specific to a type of the respective frame. For example, the report frame 402 may have a set of child nodes 405, 406, that may represent paragraphs (e.g., regular paragraphs, headings, or titles), a child node 407 that may represent a solver section, and a child node 408 that may represent an embed wrapper; a 2D drawing or 3D model may have child nodes that represent point geometry, line geometry, rectangles, text labels, and/or other geometry elements; a table or spreadsheet may have child nodes that represent table rows, which themselves may have child nodes that are table cells. It should be appreciated that other types of nodes are envisioned, such as text, equations, sections, and dynamic geometry.

A given node tree may also have nodes that do not define content itself, but rather define behaviors and additional properties. For example, a block node may direct an application to fill in the node tree under the block with automatically-generated content and according to the properties of the block itself. This behavior may be agnostic to the content type. Therefore, a block, for example, could be an automatic table of contents, a reusable shape in a drawing, a road map in a drawing, an engineering calculation module, a table of data linked to a database, a summary table of a spreadsheet (known commonly as a pivot table), or a pie chart.

Blocks may also be at the top level of a file, for example, if the content of a block is a letter document, and/or may also be used to include content from another file, such as a means of simplifying assembly of files into a master file. According to embodiments, blocks may be given a definition as a property that defines the routine for how the content is updated, and may also include parameters whose values are shared with the definition to customize the result.

Figure 4B:
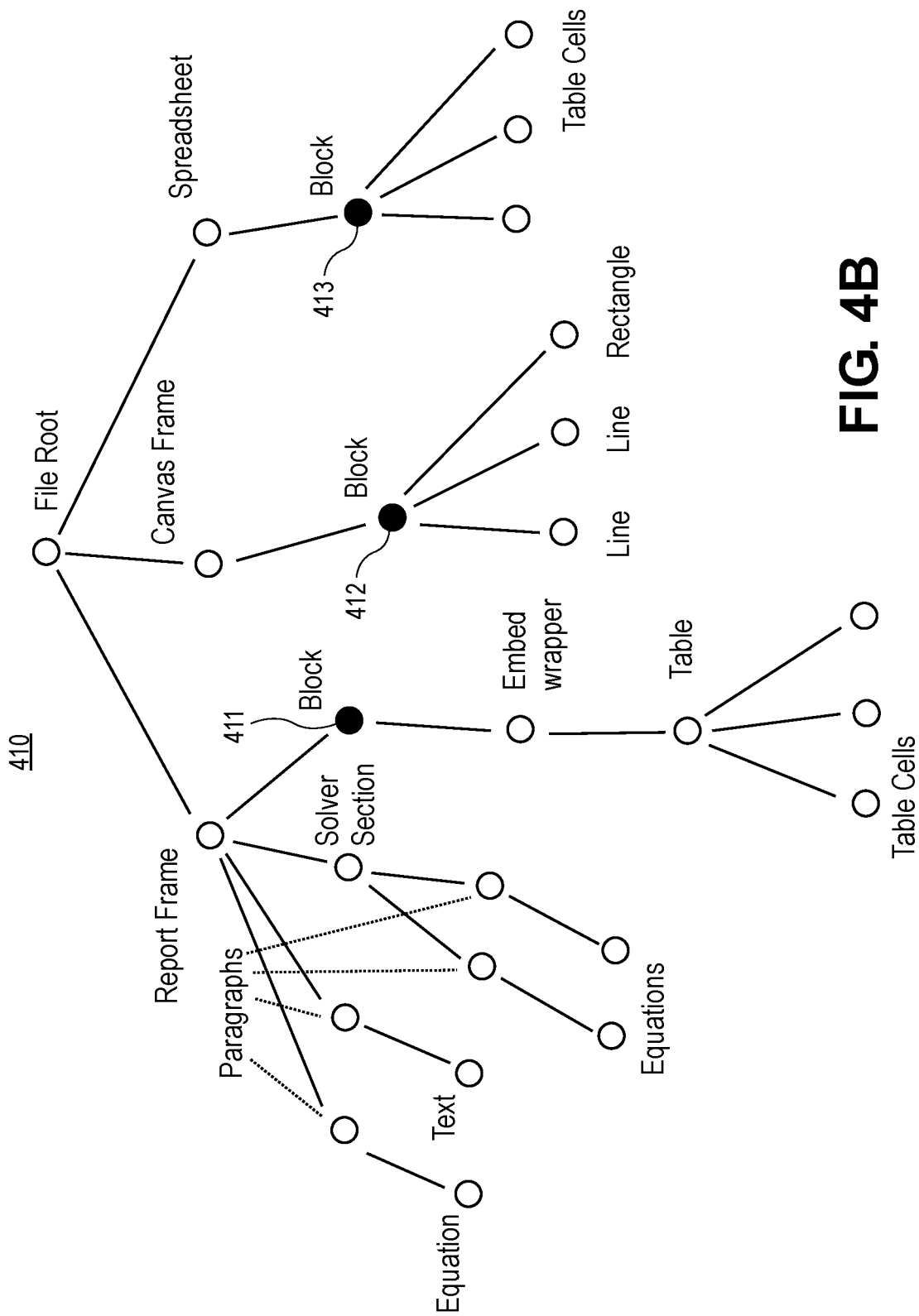

FIG. 4B depicts an example tree structure 410 with blocks 411, 412, and 413. The full integrated content structure of the tree structure with blocks enables a user with flexibility to work within the dynamic framework of the application regardless of content type, and enables the creation of a consistent look and feel in files created by the user.

According to embodiments, several types of nodes may define values, which can then, through their names, be referred to from formulas. Values may be organized into namespaces by frame and section, where the root file node may also contain the root namespace. A formula may directly refer to values in its own namespace, or in namespaces directly above it. A frame or section may be designated not to own a namespace, in which case its contained values may be instead owned by the next ancestor namespace.

For a spreadsheet cell or table cell, the value may be the value of the cell itself, and the name may be a default name or specified name in A1 format. A report equation may have a name from its formula. For example, the equation $x=2+3$ may automatically receive the name x. Frames and sections may have names, in which case the value of the reference is to the namespace under the referenced node. The namespace value contains references to all the values under that namespace.

Measurement labels in drawings may be given names, and may have measurement values referred to from formulas. Geometry elements in drawings may also be named, and may have values that are immutable objects with respective members (such as length, area, centroid, etc.). The value of a block node may be an immutable object containing members for each of the parameters and outputs of the block.

A step-by-step section may, independent of the report equations nested within it, create named values for each of the variables in its scope. A solver section may, independent of the report equations nested within it, creates named values for the unknown variables for which the section solves. The variables may be implied from the nested equations, or they may be explicitly specified as a property. The user may create references to other files, and an external reference node may create a named value where the value is the root namespace of the referenced file.

Several types of nodes may define dynamic behaviors ("dynamic nodes"), and may include value cells with formulas, report equations, step-by-step sections, solver sections, text labels with formulas, dynamic geometry, block parameters, blocks, hidden formulas, script sections, and analysis routines. Each dynamic node may have a list of dependencies, where each dependency is a reference to a value in the same file such that if that reference value changes, the dynamic node may require an update to stay up-to-date. For example, a spreadsheet cell with a formula=A1+A2 would have dependencies on A1 and A2.

Each dynamic node may also have affected values that would change as a result of the dynamic node updating. For example, a spreadsheet cell with a formula has a single affected value, which is itself, a solver section has affected values that are the variables in the section, and a block has an affected value as its own result value (which can be used by other formulas to link blocks to other dynamic nodes).

Figure 4C:
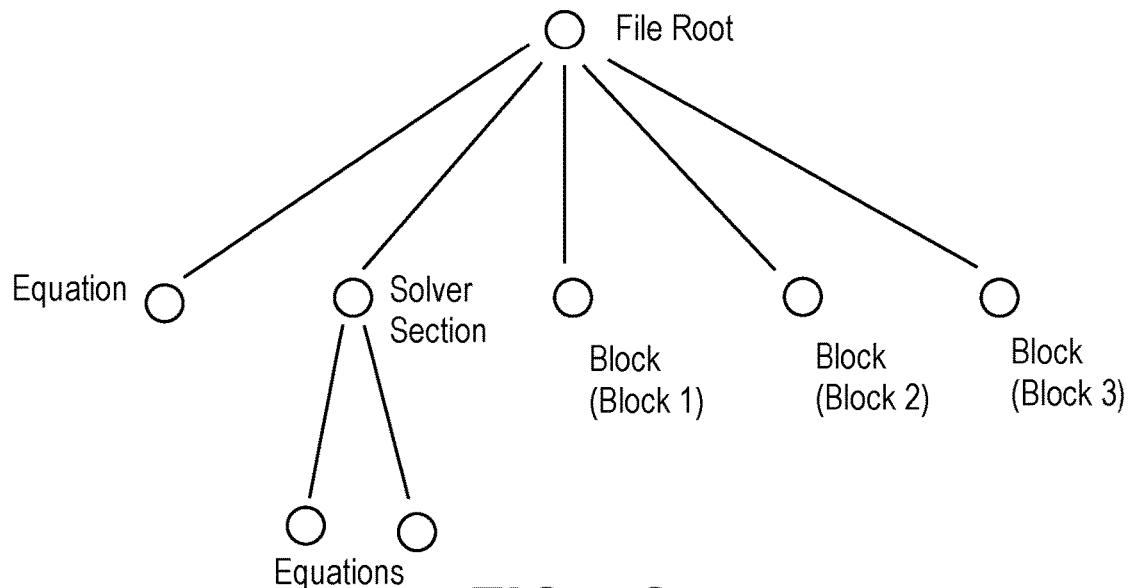

All dynamic nodes directly under the file root node (i.e., a dynamic node that does not have another dynamic node above it) may be organized by the application into update steps based on dependencies between dynamic nodes. A dynamic node may have a dependency on another dynamic node if one of its dependencies matches an affected value of another node. For example, consider a content tree 415 depicted in FIG. 4C, where the dynamic nodes are the equation node, the solver section node, Block 1, Block 2, and Block 3.

Figure 4D:
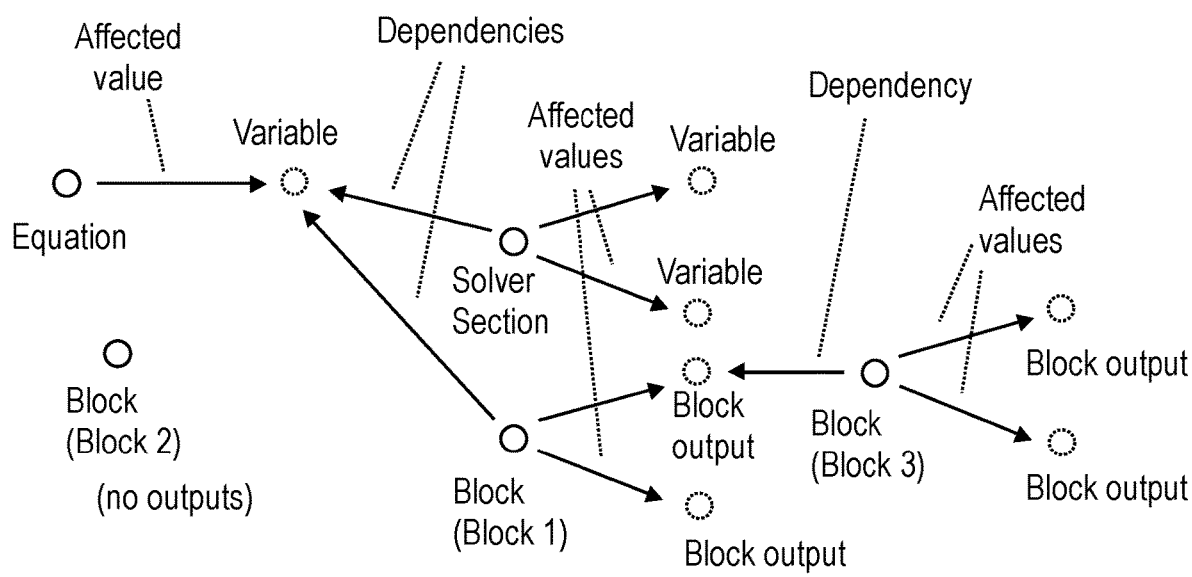
Figure 4E:
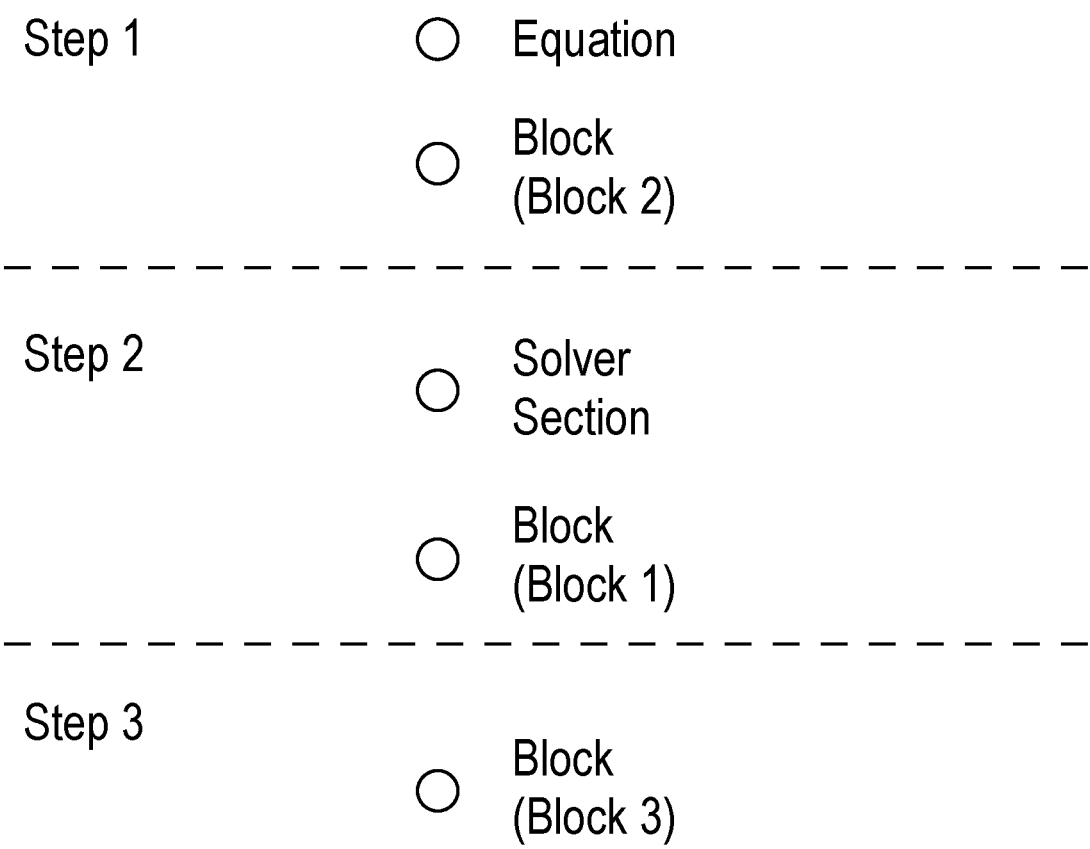

According to embodiments, the systems and methods may match dependencies and affected values of the dynamic nodes of the content tree, as illustrated in FIG. 4D. Then, the systems and methods may process the dynamic nodes into the following steps: step 1 (in this example, the equation and Block 2), step 2 (the solver section and Block 1), and step 3 (Block 3), which is illustrated in FIG. 4E.

In some situations where there are interdependencies between dynamic nodes (i.e., a circular chain of dependencies where a node ultimately depends again on itself), all interdependent dynamic nodes may fail out of the update step list.

In embodiments, step-by-step sections and solver sections may have dynamic nodes in their own descendant node trees. When these node types are updated, they, in turn, update the nested dynamic nodes with a special behavior. Additionally, a step-by-step section may update its nested dynamic nodes one by one, in their order within the node tree. However, if the step-by-step section encounters a nested frame, such as a nested drawing or table, it may update any dynamic nodes under the frame according to the general method of updating by order of dependency, as a single step in the section. For a step-by-step section, the dependencies are the cumulative dependencies of all of its nested dynamic nodes and the affected values are each of the variables in the section.

A solver section may contains nested report equations. Rather than updating those nested dynamic nodes normally, it may process them into symbolic equations. A set of analysis routines may fit into the dynamic framework, providing a convenient workflow to perform third party numerical analysis routines (e.g., structural FEA, pipe stress analysis, process simulation, or drainage modeling). They may link to given elements in a 2D drawing or a 3D model, and their outputs may be referenced in dynamic nodes in the file.

As values change, the application may mark dependent dynamic nodes as dirty, including dynamic nodes with indirect dependencies. Likewise, as the structure of formulas changes, or as the tree of named objects itself changes, the overall list of dynamic node update steps may be marked as dirty. When the application performs an update, it may bring the update steps up-to-date, and may then update all dirty nodes. As nodes are updated, they are marked not dirty again.

By default, an update may be performed after every user action that changes a value or formula. However, there may be an exception for nodes that require larger computation time, such as large blocks or analysis routines. For these, the user may select when to perform the update. If any updates are deferred, values may be shown visually to be dirty so that the user understands clearly that an update is required.

The application may enable a user to create, via a user interface, an equation object(s) having a formula that defines its content, where the user interface displays the formula together with a calculated result, the formula, or a combination thereof. As the user interacts with application (e.g., by typing characters), the application may interpret the input as a formula. For example, the user may type "Length=", and the application may detect that a formula is being input, with a variable "Length".

The application may detect a completion of the formula input in various ways. For example, the user may press the "Enter" key, at which point the application may store the equation object having the formula and corresponding variable and value. For example, the equation object may include the formula "Length=20 ft+10 ft+20 ft", in which case the variable "Length" is defined with a value of "50 ft".

The user may input additional equation objects via the user interface, where the additional equations may include variables included in other equations. For example, the user may create an equation object having a formula "Width=12 ft 8 in" (i.e., a variable "Width" having the value 12 ft 8 in), and may create another equation object having formula "Area=Length*Width" (i.e., a variable "Area" having a value of the value of "Length" times the value of "Width"), in which case the application may perform a calculation for the value of "Area", namely 50 ft times 12 ft 8 in, or 633.333 ft^2. In embodiments, when a user inputs an equation object, the user may select one or more variables to include in the equation object. For example, when the user inputs the equation object for "Area", the user may select the variables "Length" and "Width", for example from a drop-down menu, pop-up window, and/or the like, which inserts a reference to the selected variables into the equation objection without the user having to type them.

According to embodiments, variables may also be used in formulas for drawing objects (e.g., shapes and other visual objects). In particular, a user may use the application to draw an object (e.g., a rectangle), append a label to a portion of the object (e.g., a distance label to one of the edges of a rectangle), and apply a formula to a value of the label. For example, instead of an absolute value for a distance label for an edge of a rectangle, the user may select the "Length" variable (e.g., from a drop-down menu, pop-up window, and/or the like), at which point the distance label for the edge of the rectangle may have a value of 50 ft (i.e., the value of the "Length" variable).

According to embodiments, a table may be a type of frame that contains table rows (and optionally table columns), which in turn contain table cells. For example, a spreadsheet is a type of table that may contain a certain number of rows and a certain number of columns.

The application may support tables embedded in electronic files, where the tables may act as mini-spreadsheets where cells have formulas that recalculate automatically with a remainder of the electronic document. Additionally, the tables may be integrated with other equation objects, tables, and drawings such that associated formulas may contain references between components of the electronic documents.

In operation, a user may select to create and insert a table into an electronic document, and input numbers text, and formulas into the table. For example, in an exemplary table, a formula may be input into a cell (representing cell E2), where the formula indicates cells B2, C2, and D2, and variables W_D, W_L, and W_S. The application may automatically copy the formulas across a column, and the formulas may automatically recalculate if a dependent variable changes in value.

A user may use the application to create an equation object with a formula that refers to a set of values in a table. For example, the application may create an equation object "w_max" outside the table to calculate the maximum value of the numbers of column E in the table. In particular, the user may create a new equation object (e.g., by inputting the "equals" key) and add a reference to the table range by, for example, clicking and dragging the mouse across a range of cells in the table.

After the equation object is created, a drawing may be created using data from the equation object. In particular, a drawing may be created in which the value of the width may be equal to the equation object "w_max" (which in this example is 750). Accordingly, the application may separately embed drawing objects and tables within electronic documents, as well as create drawing objects from formula objects. Additionally, the application may create formulas in any of the following object types: equation objects, drawing label objects, and table cells.

According to embodiments, a frame may be converted into or used as part of a repeatable block. In particular, an interface may enable the user to select inputs and/or outputs to define the block (i.e., inputs and outputs that the user may want to be able to change while the rest of the block remains constant). An input/output list may list any selected input(s) and output(s). To save the block to a library, the user may select a library location and a name for the block, and then select a selection to publish the block to the library.

When a block is published, the block may be stored in or otherwise associated with the selected library, where the block may be used or accessed. According to embodiments, blocks may be evaluated by the user inputting other numbers or values into the input boxes (where the outputs may be updated to show the results), in which case a new block may not be created and the definition of the block may not be affected. The block itself may change of modify by the user updating the definition of the block in the library, which helps maintain control over the procedures contained in the block.

Figure 5:
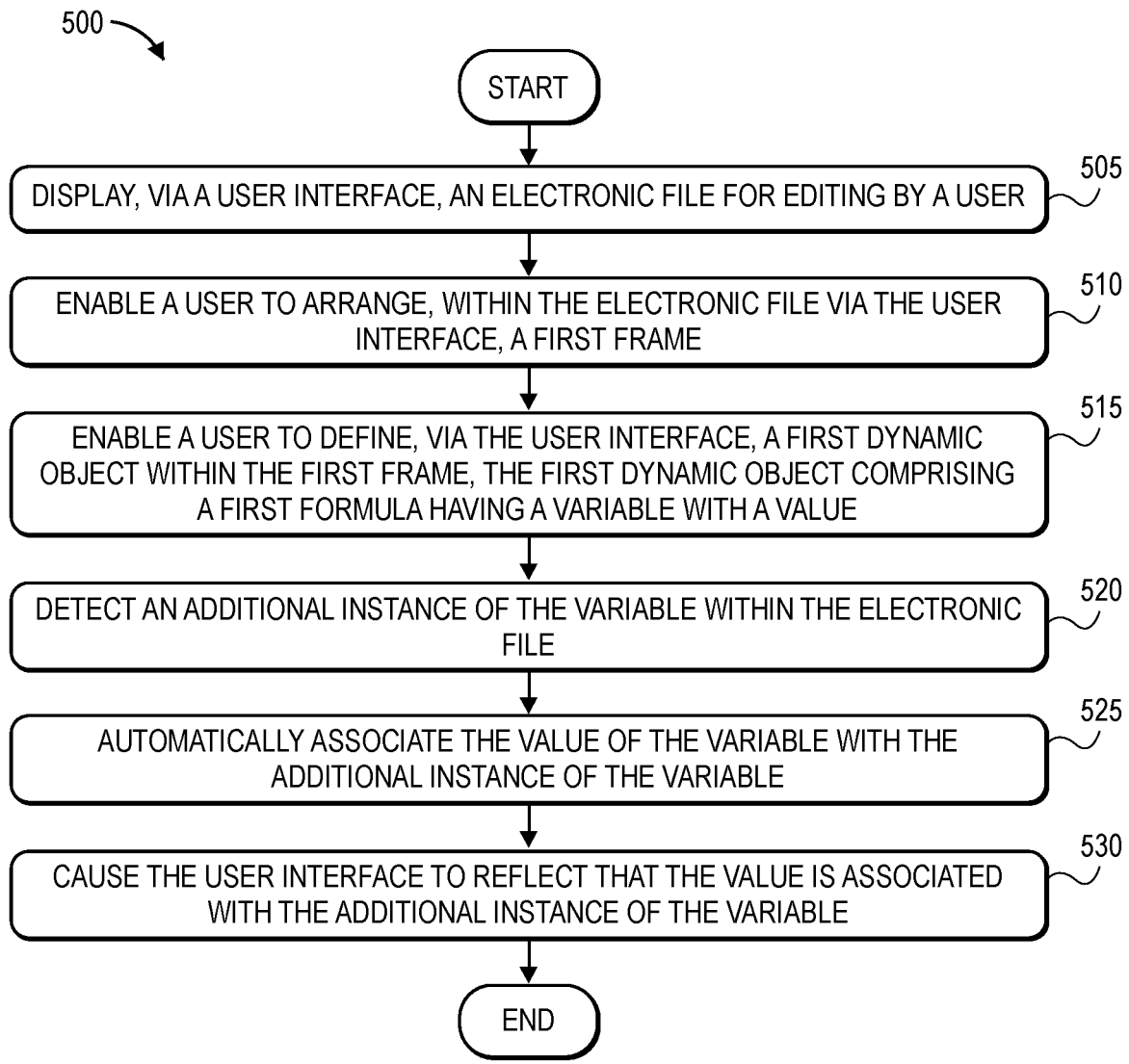
FIG. 5 depicts a flow chart of managing electronic files, in accordance with some embodiments.

FIG. 5 is a flow chart of a method 500 for managing electronic files. In particular, FIG. 5 is a flow chart for propagating a value of a variable to additional instances of the variable within an electronic file. The method 500 may be performed by an electronic device executing an application.

The method 500 may begin when the electronic device displays (block 505), in a user interface of the electronic device, an electronic file for editing by a user. It should be appreciated that the electronic file may be of any type or format. The electronic device may enable (block 510) the user to arrange, within the electronic file via the user interface, a first frame. In embodiments, the first frame may be encompassed as a portion or all of the electronic document.

The electronic device may enable (block 515) the user to define, via the user interface, a first dynamic object within the first frame, wherein the first dynamic object comprises a first formula having a variable with a value. In embodiments, the first dynamic object may be an equation or other type of object, and the user may input the components of the first dynamic object (i.e., the first formula, the variable, and the value) using various input techniques. Further, the first frame may define a first namespace that enables access to at least the first dynamic object, the variable, and the value of the variable, wherein a memory of the electronic device may store the first namespace.

The electronic device may detect (block 520) an additional instance of the variable within the electronic file. In one scenario, the electronic device may detect the additional instance of the variable by enabling the user to input, via the user interface, the additional instance of the variable within a second dynamic object. In another scenario, the electronic device may detect the additional instance of the variable by enabling the user to input, via the user interface, a second formula having the additional instance of the variable. Additionally or alternatively, a second frame having a second dynamic object may be arranged within the electronic file (and may or may not be arranged within the first frame), and the additional instance of the variable may be defined within the second dynamic object of the second frame. Additionally or alternatively, the additional instance of the variable may be associated with a second formula within the electronic document.

The electronic device may automatically associate (block 525) the value of the variable with the additional instance of the variable. In embodiments, the memory of the electronic device may create, update, and/or store a record (e.g., a namespace) associating the value with each instance of the variable. Alternatively or additionally, the electronic device may, in response to detecting the additional instance of the variable, retrieve the first namespace from the memory to access the value of the variable.

The electronic device may display (block 530), in the user interface, an indication that the value is associated with the additional instance of the variable. In embodiments, if the additional instance of the variable is associated with a second formula within the electronic document, the electronic device may automatically display, within the electronic file via the user interface, the value of the variable that is reflected in the second formula.

Figure 6:
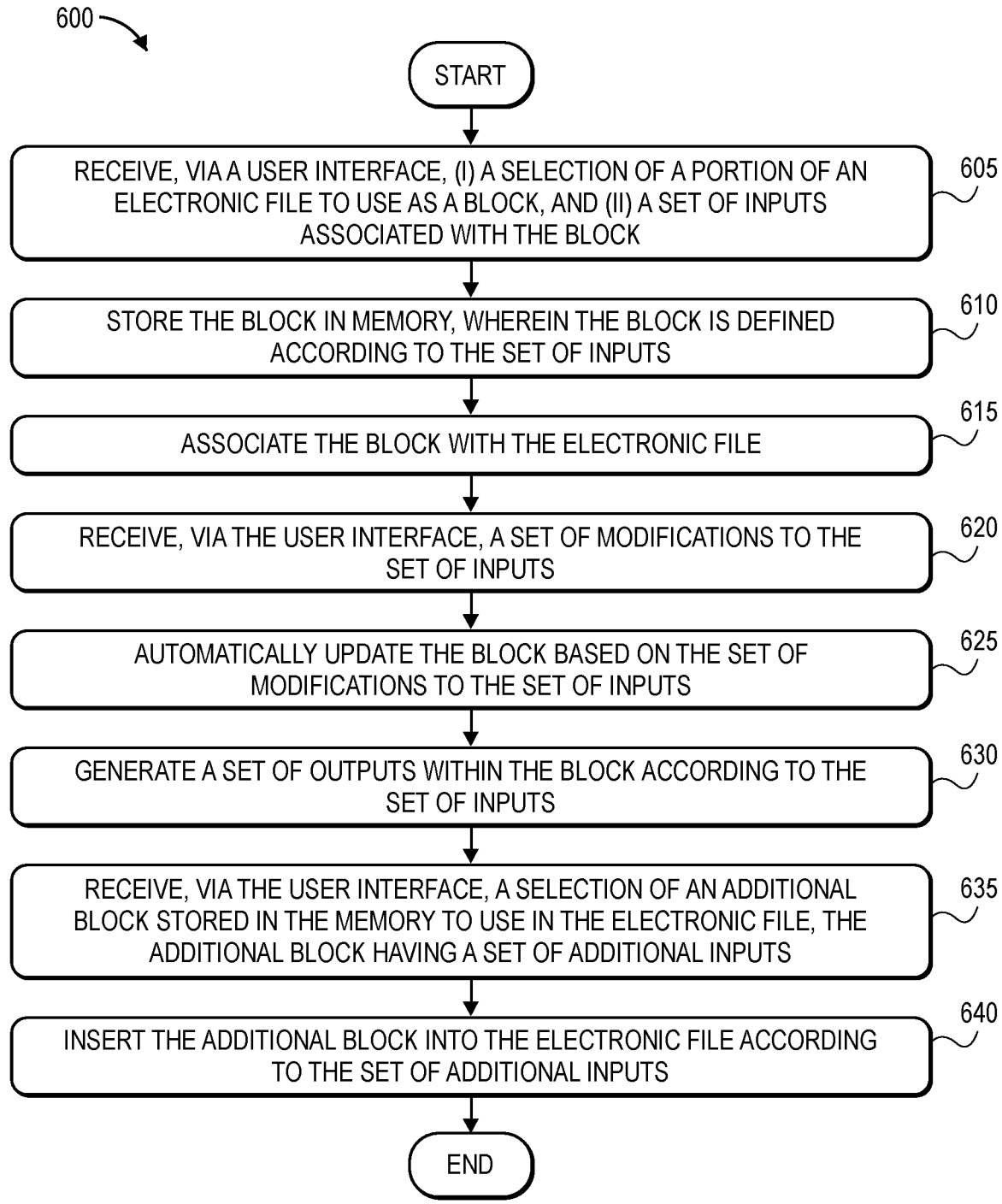
FIG. 6 depicts a flow chart of implementing a set of blocks within an electronic file, in accordance with some embodiments.

FIG. 6 is a flow chart of a method 600 for implementing a set of blocks within an electronic file. The method 600 may be performed by an electronic device executing an application.

The method 600 may begin when the electronic device receives (block 605), via a user interface, (i) a selection of a portion of the electronic file to use as a block, and (ii) a set of inputs associated with the block. In embodiments, if the electronic file is a spreadsheet, the selection of the portion of the electronic file may be a selection of a set of cells of the spreadsheet. Further, the set of inputs may be at least one of a set of values or a set of formulas, and the set of inputs may be linked to a set of additional inputs associated with the electronic file.

The electronic device may store (block 610) the block in memory, wherein the block is defined according to the set of inputs. Further, the electronic device may associate (block 615) the block with the electronic file, for example by updating the electronic file to include data associated with the block.

After associating the block with the electronic file, the electronic device may receive (block 620), via the user interface, a set of modifications to the set of inputs. In embodiments, the set of modifications may be one or more changes to any of the set of inputs. The electronic device may then automatically update (block 625) the block based on the set of modifications to the set of inputs. Thus, the block updates without the user having to manually copy and paste content, among other benefits.

In an implementation, the electronic device may generate (block 630) a set of outputs according to the set of inputs. In embodiments, the set of outputs may be referenced by an additional block within the electronic file.

The electronic device may also receive (block 635), via the user interface, a selection of an additional block stored in the memory to use in the electronic file, where the additional block may have a set of additional inputs. Additionally, the electronic device may insert (block 640) the additional block into the electronic file according to the set of additional inputs. In embodiments, the electronic device may also link the block with the additional block within the electronic file.

Figure 7:
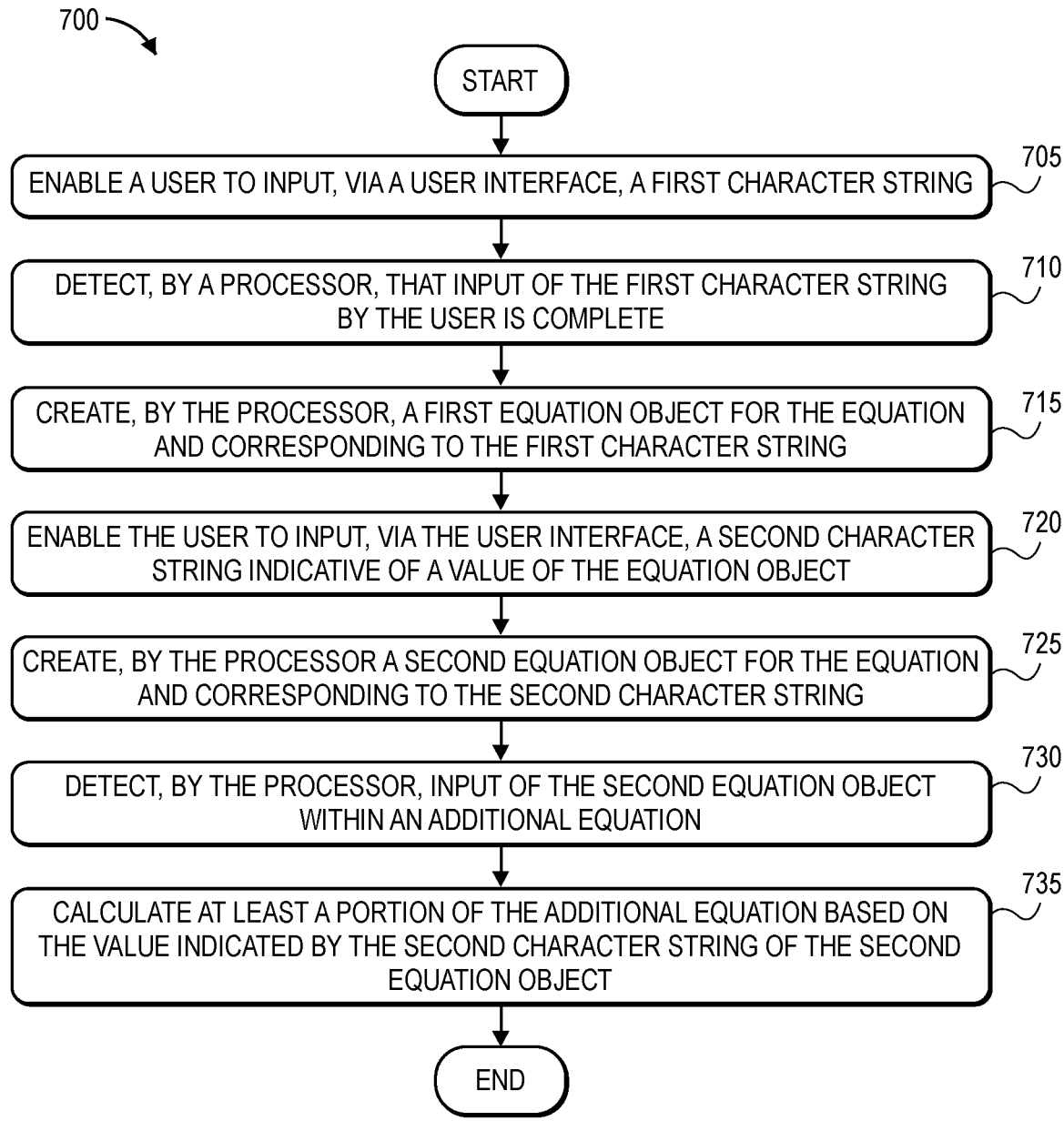
FIG. 7 depicts a flow chart of facilitating input of an equation within an application, in accordance with some embodiments.

FIG. 7 is a flow chart of a method 700 for facilitating input of an equation within an application executing on an electronic device. The method 700 may be performed by the electronic device executing the application.

The method 700 may begin when the electronic device enables (block 705) a user to input, via a user interface, a first character string. In embodiments, the first character string may include one or more alphanumeric characters. The electronic device may detect (block 710) that input of the first character string by the user is complete. In embodiments, the electronic device may detect that the input is complete by detecting that the user inputs an "equals sign" character.

After detecting that input of the first character string by the user is complete, the electronic device may create (block 715) a first equation object for the equation and corresponding to the first character string. The electronic device may further enable (block 720) the user to input a second character string indicative of a value of the equation object. In some embodiments, enabling the user to input the second character string may comprise enabling the user to input a set of additional equation objects having a set of values, and calculating the value of the equation object based on the set of values of the set of additional equation objects.

The electronic device may create (block 725) a second equation object for the equation and corresponding to the second character string. Accordingly, the first and second equation objects may be created and utilized within the electronic document for various functionalities. Additionally, the electronic device may detect (block 730) input of the second equation objection within an additional equation, and the electronic device may accordingly calculate (block 735) at least a portion of the additional equation based on the value indicated by the second character string of the second equation object.

Figure 8:
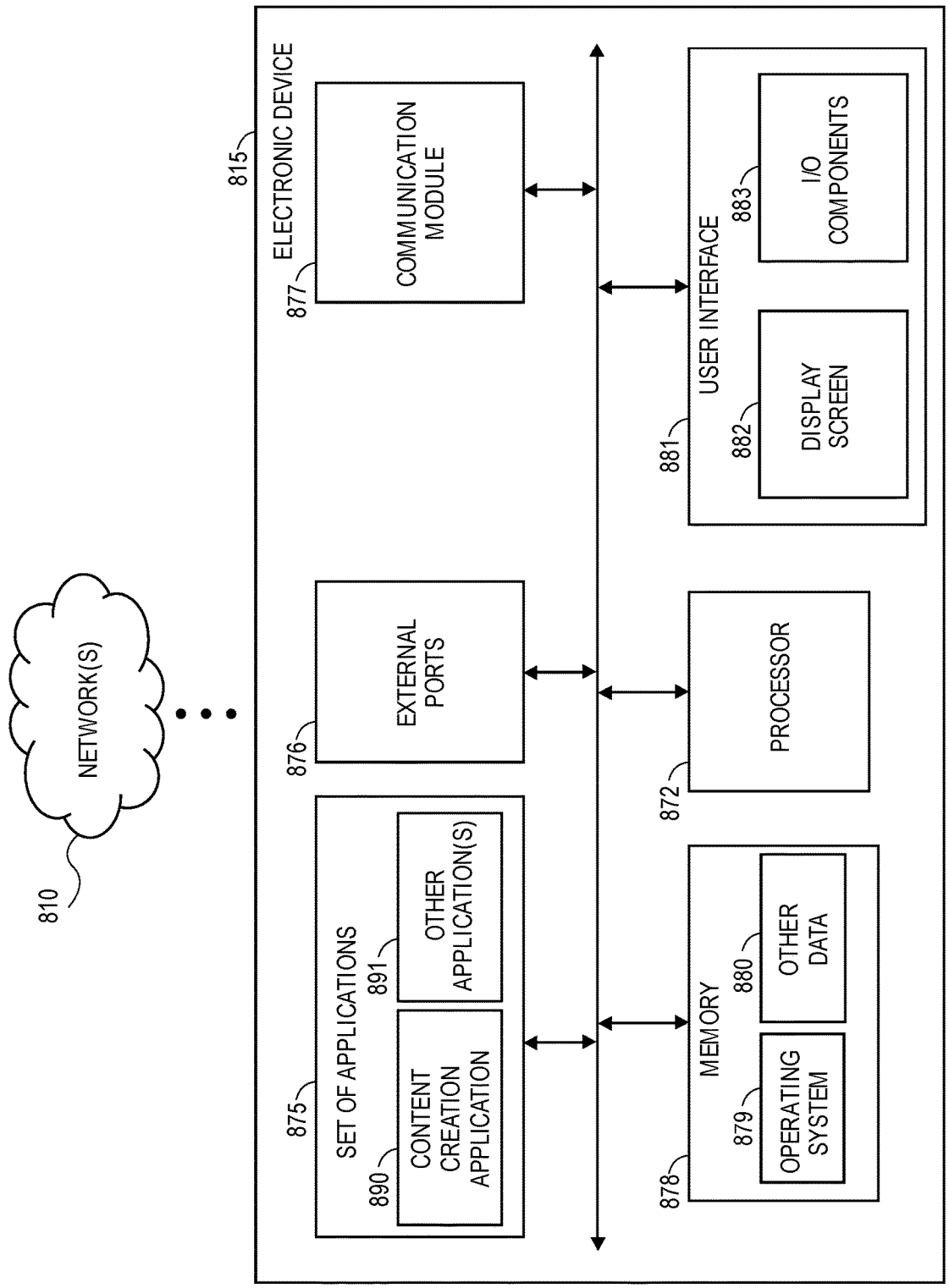
FIG. 8 is a hardware diagram of an electronic device, in accordance with some embodiments.

FIG. 8 illustrates a diagram of an exemplary electronic device 815 (such as one of the devices 102, 103, 104 as discussed with respect to FIG. 1) in which the functionalities as discussed herein may be implemented. It should be appreciated that the electronic device 815 may be configured to be connect to and communicate with various entities, components, and devices, as discussed herein. Further, although depicted and described as the electronic device 815, it should be appreciated that the electronic device 815 may also be a server, such as the central server 110 as described with respect to FIG. 1.

The electronic device 815 may include a processor 872 as well as a memory 878. The memory 878 may store an operating system 879 capable of facilitating the functionalities as discussed herein as well as a set of applications 875 (i.e., machine readable instructions). For example, one of the set of applications 875 may be a content creation application 890 configured to facilitate various functionalities associated with creating electronic files or documents. It should be appreciated that one or more other applications 891 are envisioned.

The processor 872 may interface with the memory 878 to execute the operating system 879 and the set of applications 875. According to some embodiments, the memory 878 may also include other data 880 that may be used by the set of applications 875. The memory 878 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 815 may further include a communication module 877 configured to communicate data via one or more networks 810. According to some embodiments, the communication module 877 may include one or more transceivers (e.g., WWAN, WLAN, and/or WPAN transceivers) functioning in accordance with IEEE standards, 3GPP standards, or other standards, and configured to receive and transmit data via one or more external ports 876. For example, the communication module 877 may receive, via the network 810, data associated with features offered by the content creation application 890.

The electronic device 815 may further include a user interface 881 configured to present information to a user and/or receive inputs from the user. As shown in FIG. 8, the user interface 881 may include a display screen 882 and I/O components 883 (e.g., ports, capacitive or resistive touch sensitive input panels, keys, buttons, lights, LEDs, speakers, microphones). According to some embodiments, the user may access the electronic device 815 via the user interface 881 to review information and/or perform other functions. In some embodiments, the electronic device 815 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 872 (e.g., working in connection with the operating system 879) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

According to some embodiments, a computer-implemented method of implementing a set of blocks within an electronic file may be provided. The method may include: receiving, via a user interface, (i) a selection of a portion of the electronic file to use as a block, and (ii) a set of inputs associated with the block; storing the block in memory, wherein the block is defined according to the set of inputs; associating, by a processor, the block with the electronic file; and after associating the block with the electronic file: receiving, via the user interface, a set of modifications to the set of inputs, and automatically updating, by the processor, the block based on the set of modifications to the set of inputs.

In embodiments, the electronic file is a spreadsheet, where receiving the selection of the portion of the electronic file to use as the block comprises: receiving, via the user interface, a set of cells of the spreadsheet.

The method may further comprise: receiving, via the user interface, a selection of an additional block stored in the memory to use in the electronic file, the additional block having a set of additional inputs; and inserting the additional block into the electronic file according to the set of additional inputs.

In embodiments, receiving the set of inputs associated with the block comprises: receiving, via the user interface, at least one of a set of values or a set of formulas.

The method may further comprise: linking the block with an additional block within the electronic file.

In embodiments, the set of inputs are linked to a set of additional inputs associated with the electronic file.

The method may further comprise: generating a set of outputs within the block according to the set of inputs, wherein the set of outputs are referenced by an additional block within the electronic file.

According to other embodiments, a system for implementing a set of blocks within an electronic file may be provided. The system may include a user interface, a memory storing a set of computer-executable instructions, and a processor interfacing with the user interface and the memory. The processor is configured to execute the set of computer-executable instructions to cause the processor to: receive, via a user interface, (i) a selection of a portion of the electronic file to use as a block, and (ii) a set of inputs associated with the block, store the block in the memory, wherein the block is defined according to the set of inputs, associate the block with the electronic file, and after associating the block with the electronic file: receive, via the user interface, a set of modifications to the set of inputs, and automatically update, by the processor, the block based on the set of modifications to the set of inputs.

In other embodiments, a non-transitory computer-readable medium may be provided. The non-transitory computer-readable medium may comprise a plurality of instructions which, when executed by one or more processors, cause the one or more processors to: receive, via a user interface, (i) a selection of a portion of an electronic file to use as a block, and (ii) a set of inputs associated with the block, store the block in memory, wherein the block is defined according to the set of inputs, associate the block with the electronic file, and after associating the block with the electronic file: receive, via the user interface, a set of modifications to the set of inputs, and automatically update the block based on the set of modifications to the set of inputs.

According to further embodiments, a computer-implemented method in an electronic device of facilitating input of an equation within an application executing on the electronic device may be provided. The method may include: enabling a user to input, via a user interface of the electronic device, a first character string; detecting, by a processor, that input of the first character string by the user is complete; and after detecting that input of the first character string by the user is complete: creating, by the processor, a first equation object for the equation and corresponding to the first character string, enabling the user to input, via the user interface, a second character string indicative of a value of the equation object, and creating, by the processor, a second equation object for the equation and corresponding to the second character string.

The method may further comprise: detecting, by the processor, input of the second equation object within an additional equation; and calculating at least a portion of the additional equation based on the value indicated by the second character string of the second equation object.

In embodiments, enabling the user to input the second character string may comprise: enabling the user to input a set of additional equation objects having a set of values, and calculating the value of the equation object based on the set of values of the set of additional equation objects.

In embodiments, detecting that input of the character string by the user is complete may comprise: detecting, by the processor, that the user inputs the equals sign character.

According to additional embodiments, a system for facilitating input of an equation within an application may be provided. The system may include: a user interface, a memory storing a set of computer-executable instructions, and a processor interfacing with the user interface and the memory. The processor may be configured to execute the set of computer-executable instructions to cause the processor to: receive, via the user interface, a first character string, detect that input of the first character string by the user is complete, and after detecting that input of the first character string by the user is complete: create a first equation object for the equation and corresponding to the first character string, receive, via the user interface, a second character string indicative of a value of the equation object, and create a second equation object for the equation and corresponding to the second character string.

According to further embodiments, a non-transitory computer-readable medium is provided. The non-transitory computer-readable medium may include a plurality of instructions which, when executed by one or more processors, cause the one or more processors to: enable a user to input, via a user interface, a first character string, detect that input of the first character string by the user is complete, and after detecting that input of the first character string by the user is complete: create a first equation object for the equation and corresponding to the first character string, enable the user to input, via the user interface, a second character string indicative of a value of the equation object, and create the processor, a second equation object for the equation and corresponding to the second character string.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed is:

1. A system for managing electronic files, comprising:
a user interface;
a memory storing a set of computer-executable instructions; and
a processor interfacing with the user interface and the memory, and configured to execute the set of computer-executable instructions to cause the processor to:
display, within the user interface, an electronic file for editing by a user,
receive, within the electronic file via the user interface, a selection to arrange a first frame,
define a first dynamic object within the first frame, wherein the first dynamic object comprises a first formula having a first instance of a variable,
receive, via the user interface, a value for the variable of the first formula,
after receiving the value for the variable of the first formula, receive, via the user interface, an input for a second formula having a second instance of the variable,
automatically associate the value of the variable with the second instance of the variable, and
display, within the user interface, an indication that the value is associated with the second instance of the variable.

2. The system of claim 1, wherein a second frame having a second dynamic object is arranged within the electronic file, and wherein the second instance of the variable is defined within the second dynamic object of the second frame.

3. The system of claim 2, wherein the second frame is arranged within the first frame.

4. The system of claim 1, wherein to receive the input for the second formula, the processor is configured to:
receive, via the user interface, the input for the second formula within a second dynamic object.

5. The system of claim 1, wherein the first frame defines a first namespace that enables access to at least the first dynamic object, the variable, and the value of the variable, wherein the memory stores the first namespace.

6. The system of claim 5, wherein to automatically associate the value of the variable with the second instance of the variable, the processor is configured to:
in response to receiving the input for the second formula, retrieve the first namespace from the memory to access the value of the variable.

7. The system of claim 5, wherein to automatically associate the value of the variable with the second instance of the variable, the processor is configured to:
update the first namespace to reflect that the value of the variable is associated with the second instance of the variable.

8. The system of claim 1, wherein to display, within the user interface, the indication that the value is associated with the second instance of the variable, the processor is configured to:
automatically display, within the user interface, the value of the variable being reflected in the second formula.

9. A computer-implemented method in an electronic device of managing electronic files, the method comprising:
displaying, in a user interface of the electronic device, an electronic file for editing by a user;
receiving, within the electronic file via the user interface, a selection to arrange a first frame;
defining a first dynamic object within the first frame, wherein the first dynamic object comprises a first formula having a first instance of a variable;
receiving, via the user interface, a value for the variable of the first formula,
after receiving the value for the variable of the first formula, receiving, via the user interface, an input for a second formula having a second instance of the variable;
automatically associating, by the processor, the value of the variable with the second instance of the variable; and
displaying, in the user interface, an indication that the value is associated with the second instance of the variable.

10. The computer-implemented method of claim 9, wherein a second frame having a second dynamic object is arranged within the electronic file, and wherein the second instance of the variable is defined within the second dynamic object of the second frame.

11. The computer-implemented method of claim 10, wherein the second frame is arranged within the first frame.

12. The computer-implemented method of claim 9, wherein receiving the input for the second formula comprises:
receiving, via the user interface, the input for the second formula within a second dynamic object.

13. The computer-implemented method of claim 9, wherein the first frame defines a first namespace that enables access to at least the first dynamic object, the variable, and the value of the variable, wherein a memory of the electronic device stores the first namespace.

14. The computer-implemented method of claim 13, wherein automatically associating the value of the variable with the second instance of the variable comprises:
    in response to receiving the input for the second formula, retrieving the first namespace from the memory to access the value of the variable.

15. The computer-implemented method of claim 13, wherein automatically associating the value of the variable with the second instance of the variable comprises:
    updating the first namespace in the memory to reflect that the value of the variable is associated with the second instance of the variable.

16. The computer-implemented method of claim 15, wherein displaying, in the user interface, the indication that the value is associated with the second instance of the variable comprises:
    automatically displaying, within the user interface, the value of the variable being reflected in the second formula.

\* \* \* \* \*